Figure 1:
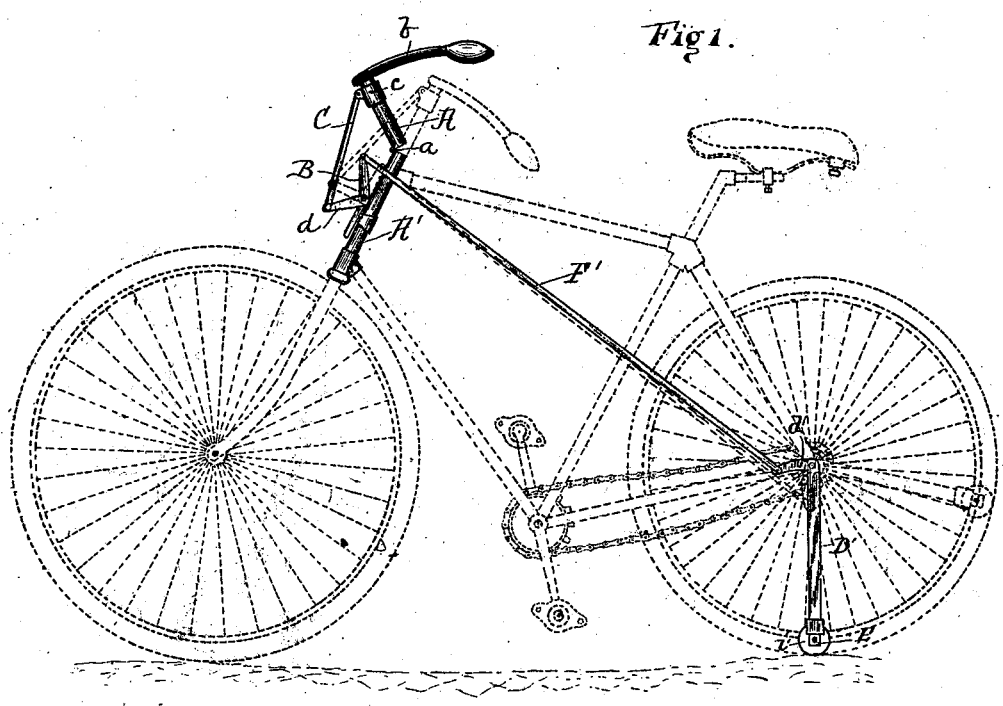

(No Model.) H. J. HYAMS.
BICYCLE SUPPORT.

No. 502,298. Patented Aug. 1, 1893.

WITNESSES:
L. C. Leoty
R. C. Douthitt

INVENTOR
Hyam, J. Hyams
BY
Toulmin & McCarty
ATTORNEYS (No Model.)
H. J. HYAMS.
BICYCLE SUPPORT.
No. 502,298. Patented Aug. 1, 1893.
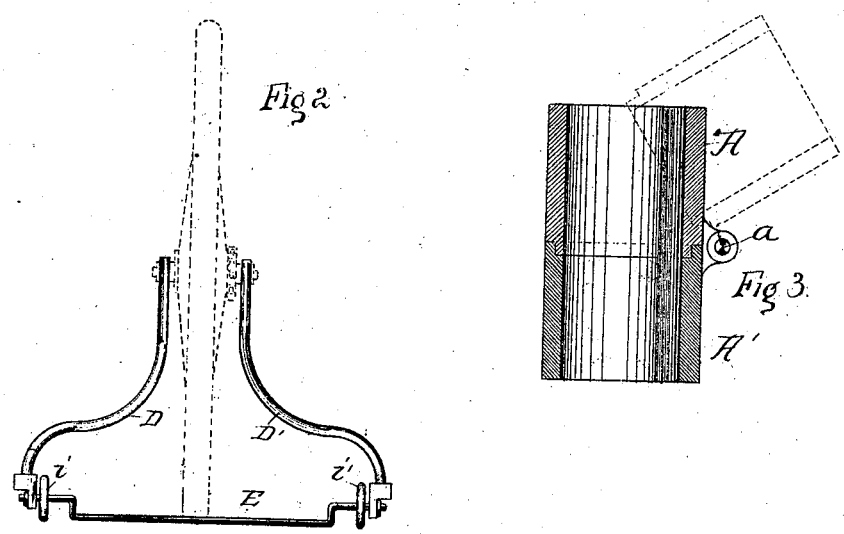
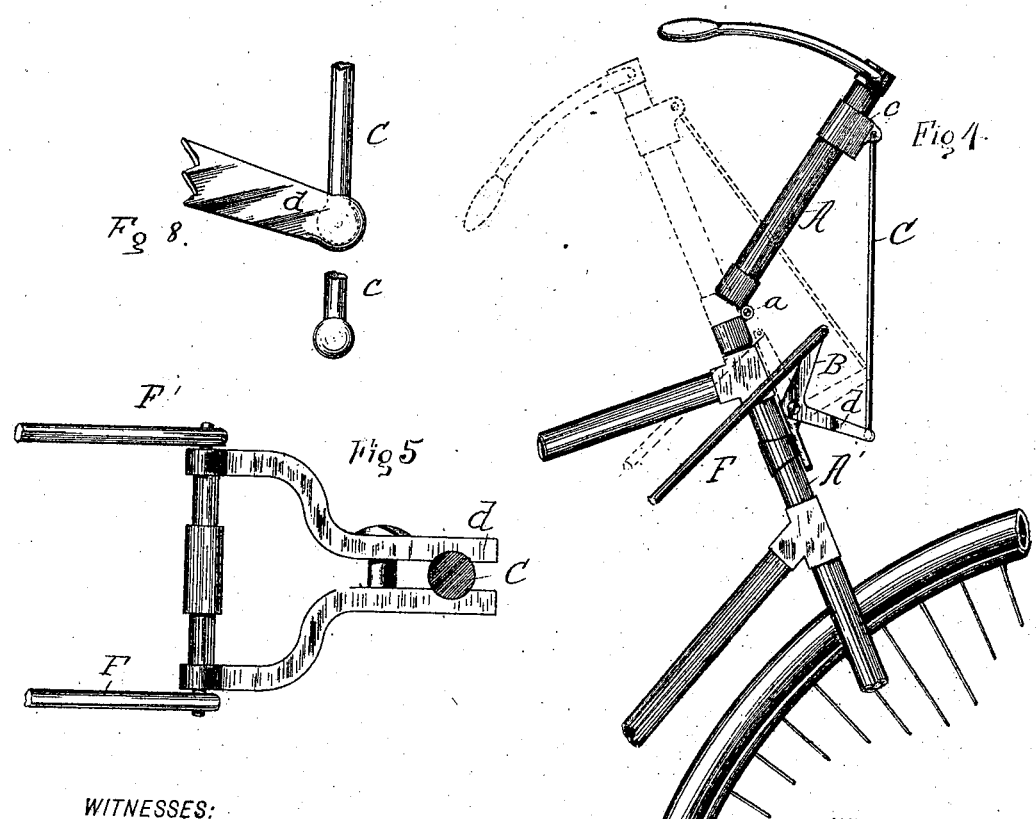
WITNESSES:
L. C. Leory
R. C. Douthitt
INVENTOR
Hyam J. Hyams
BY
Toulmin & M Carty
ATTORNEYS

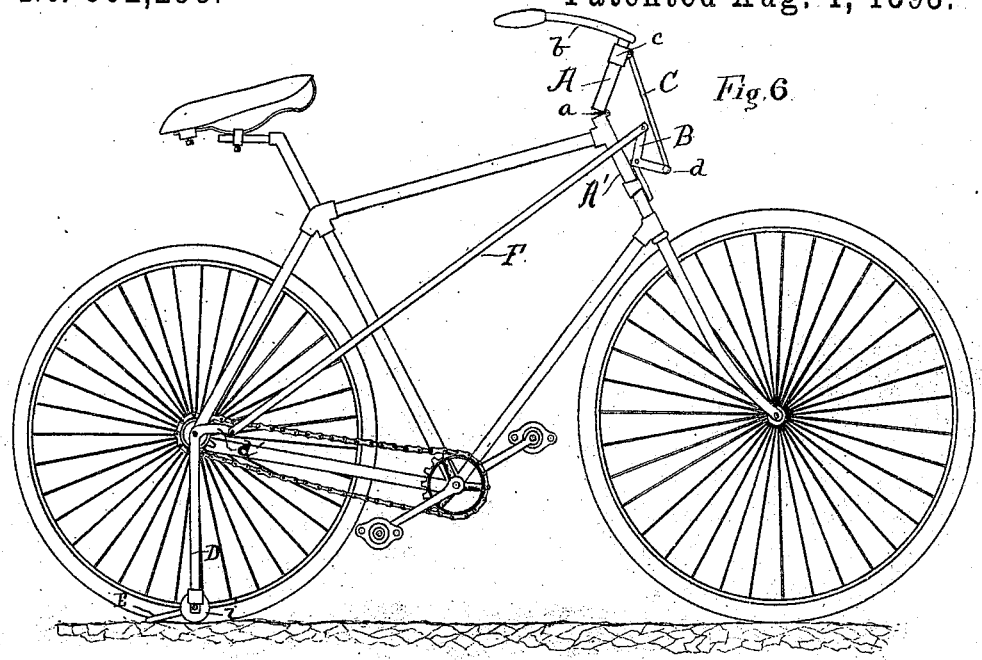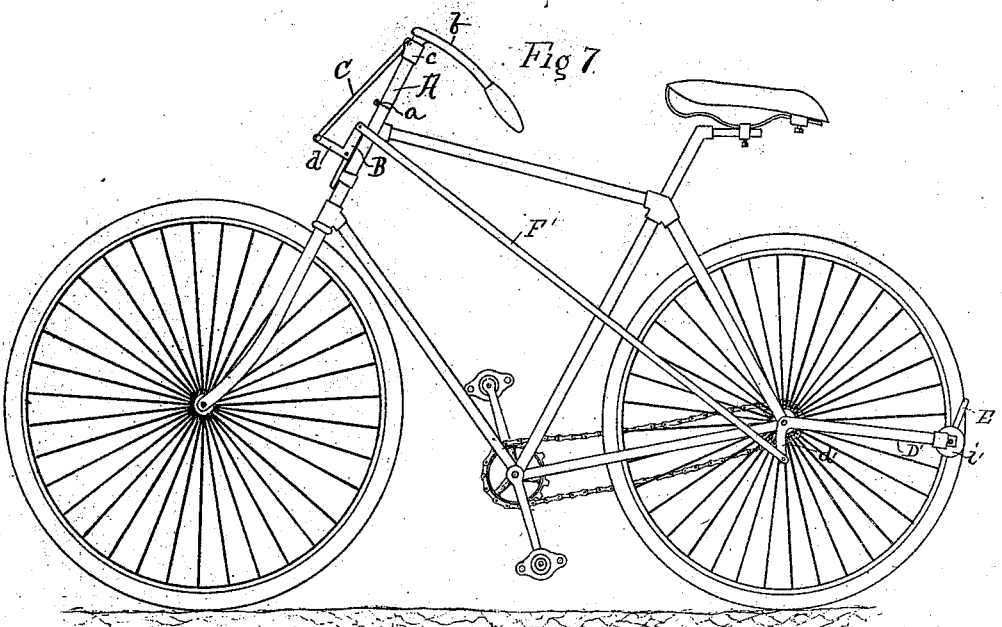

UNITED STATES PATENT OFFICE.

HYAM J. HYAMS, OF DAYTON, OHIO, ASSIGNOR OF ONE-HALF TO HENRY J. MYERS, OF SAME PLACE.

BICYCLE-SUPPORT.

SPECIFICATION forming part of Letters Patent No. 502,298, dated August 1, 1893.

Application filed November 30, 1892. Serial No. 453,673. (No model.)

*To all whom it may concern:*

Be it known that I, HYAM J. HYAMS, of Dayton, county of Montgomery, State of Ohio, have invented a new and useful Improvement in Bicycle-Supports, of which the following is a specification.

My invention relates to new and useful improvements in bicycle supports, and consists of means that will be hereinafter described in the specification and specifically mentioned in the claim.

The object of my invention is to provide a support that may be operated without removing the hands from the steering post handles, and that may be applied to any of the bicycles in common use, not requiring any specially constructed steering post or gearing.

For a detailed description of my invention reference is made to the accompanying drawings forming a supplement to the specification, and claim.

In these drawings, letters of similar import signify corresponding parts throughout the several views.

Figure 1, is a side elevation of an ordinary bicycle, commonly called, "safety," in broken lines. The solid lines represent the portion that embodies my invention. The broken lines representing the handles and the upper part of the head, and the broken lines representing my attachment, are designed to show the positions these parts assume, when the support is raised from the ground; Fig. 2, a rear elevation of the driving wheel in dotted lines with the legs of the support pivoted to the axle; Fig. 3, a sectional detached view of the hinged connection between the upper and lower parts of the head. The broken lines indicate the position assumed by the upper part when thrown forward on the hinge, to bring the support in contact with the ground. Fig. 4, a side elevation of the head, showing portions of the rim of the front wheel and coupling bar. The broken lines in this view show the position assumed when the upper portion of the head is drawn to its normal position, to remove the support from the ground. Fig. 5, a detached plan view of a bell-crank, showing portions of the connecting rods; Fig. 6, a side elevation of a bicyle with my improved attachment; Fig. 7, an elevation of the reverse side to that shown in Fig. 6. Fig. 8 are detached, detail views of rod C and part of the bell crank.

The head of the bicycle for the purposes of my attachment, is formed in two parts,—A and A' which are connected by a substantial hinged joint (*a*). By this construction the upper part of the head which supports the handles (*b*) may be turned back and forth as shown in the various views.

B indicates a bell-crank having its fulcrum in the front of and adjacent to the lower part A' of the head. A link connection is effected between the upper and lower portions of the head, by a short rod C, having its ends terminating in balls adapted to fit in a corresponding socket in bracket (*c*) rigidly secured to the upper portion of the head, and in a similar socket in the arm (*d*) of the bell-crank B, whereby the said rod is allowed to swivel and conform to the different positions of the front wheel.

D and D' indicate legs pivoted to the axle of the rear or driving wheel. These legs extend radially from the axis of said wheel toward the ground as shown in Fig. 2, in order to afford a substantial support; they are provided with openings in their lower ends in which are journaled the ends of an angular transverse ground rod E; the object of this rod is to add strength and firmness to the support, and prevent the legs from spreading.

In order that the legs may assume a vertical position, which is necessary, to effect a firm and substantial support and at the same time provide means for preventing their spreading or becoming bent or broken, I construct the ground rod with its two ends of angular form as seen in Figs. 2, 6, and 7. This allows the legs to be placed in the only position calculated to afford a reliable support, and the angular ground rod is permitted to perform its functions without coming in contact with the wheel which would render the support quite impracticable if it did. Near the pivotal points or the upper ends of the legs they are provided with integral arms *e* and *e'* extending laterally in a forward direction.

*i* and *i'* are rollers pivoted to the ground rod E. These rollers admit of the bicycle being propelled when the support is brought in contact with the ground as shown in Figs. 1, 2, and 6, and are useful in enabling beginners to drive the machine and obtain the required practice in learning the art, without incurring the dangers naturally incident thereto.

F and F' are longitudinal link or connecting rods that connect the front and rear mechanisms constituting my invention; these rods are attached at one end to the parallel arms of the bell-crank B, and similarly attached at the other end, to the arms $e$ and $e'$ of the legs. By these connections the system of levers is completed, and the action transmitted to the bell-crank by the opening and closing of the hinged portion of the head, is likewise conveyed to the legs of the support, either to raise them from or bring them into contact with the ground.

From the foregoing description, the manner of operating my improved attachment is apparent, and its utility, simplicity and efficiency as a substantial bicycle support manifest. By disjoining the head of any of the bicycles generally in use, and hinging the parts in the manner herein described, my improvement may be applied thereto. In applying it to that class of bicycles designed for the use of female riders, slight modification only, is necessary in the connecting rods, to carry them out of the way of mounting or dismounting, and by the employment of an additional bell-crank that may be located on a horizontal plane with the axes of the wheels. In this modified construction, the rods F and F' would be dispensed with and shorter link rods substituted. The rods connecting the head of the bicycle with the additional bell-crank would be on an angle of about forty five degrees and thus offer no obstruction.

Other modifications may be made in the arrangement of the parts described without departing from the essential features of my invention.

I am aware that the idea of using bell crank levers on bicycles is not new, as the same has been used in connection with the gearing, and also to raise and lower a pair of wheels; therefore I do not claim such, broadly.

What I do claim, however, is—

In a bicycle support, the combination with the steering post having a pivotal point near its median portion, a bell crank pivoted below said pivotal point, a link rod connecting said bell crank with the upper portion of the steering post, supporting legs pivoted to the rear axle and joined to the bell crank on the steering post by connecting rods, of a ground rod having its two ends angular in form, journaled transversely in the lower ends of the supporting legs, to afford a brace for said legs and allow them to be lowered to a vertical position, the said angular rod the meanwhile being in contact with the ground and free from contact with the periphery of the wheel, substantially as described.

In testimony whereof I have hereunto set my hand this 17th of November, 1892.

HYAM J. HYAMS.

Witnesses:
GEORGE H. WOOD,
CHARLES E. MENTEL.